United States Patent
Wu et al.

(10) Patent No.: US 10,742,453 B1
(45) Date of Patent: Aug. 11, 2020

(54) NONLINEAR EQUALIZER WITH NONLINEARITY COMPENSATION

(71) Applicant: Xilinx, Inc., San Jose, CA (US)

(72) Inventors: Min Wu, San Jose, CA (US); Hongtao Zhang, San Jose, CA (US); Yu Xu, Palo Alto, CA (US)

(73) Assignee: Xilinx, Inc., San Jose, CA (US)

( * ) Notice: Subject to any disclaimer, the term of this patent is extended or adjusted under 35 U.S.C. 154(b) by 1 day.

(21) Appl. No.: 16/283,453

(22) Filed: Feb. 22, 2019

(51) Int. Cl.
   *H04L 25/03* (2006.01)
(52) U.S. Cl.
   CPC .......... *H04L 25/03006* (2013.01); *H04L 2025/03636* (2013.01)
(58) Field of Classification Search
   CPC ........... H04L 25/03878; H04L 27/2647; H04L 25/03885; H04L 25/03267; H04L 25/03006; H04L 2027/0038; H04L 2025/3636; H03H 21/0012
   See application file for complete search history.

(56) References Cited

U.S. PATENT DOCUMENTS

| | | | |
|---|---|---|---|
| 7,599,431 B1 | 10/2009 | Anderson et al. | |
| 9,025,691 B1 | 5/2015 | Wu et al. | |
| 9,461,851 B1 | 10/2016 | Liao et al. | |
| 9,876,656 B1 | 1/2018 | Freitas | |
| 10,009,195 B2 * | 6/2018 | Pham ................ | H04L 25/03044 |

OTHER PUBLICATIONS

Ogunfunmi, Tokunbo et al., "Equalization of Non-Linear Channels Using a Volterra-Based Non-Linear Adaptive Filter," IEEE 54th International Midwest Symposium on Circuits and Systems (MWSCAS), Aug. 7, 2011, pp. 1-4, IEEE, Piscataway, New Jersey, USA.
Xia, Chunmin et al., "Nonlinear Electrical Equalization for Different Modulation Formats with Optical Filtering," IEEE Journal of Lightwave Technology, Apr. 2007, pp. 996-1001, vol. 25, No. 4, IEEE, Piscataway, New Jersey, USA.
Agarossi, L. et al., "Equalization of Non Linear Optical Channels," EEE 1998 International Conference on Communications, Jun. 7, 1998, pp. 662-667, vol. 2, IEEE, Piscataway, New Jersey, USA.
Cioffi, John M. et al., "Adaptive Equalization in Magnetic-Disk Storage Channels," IEEE Communications Magazine, Feb. 1990, pp. 14-29, IEEE, Piscataway, New Jersey, USA.
White, S.A. et al., "A Nonlinear Adaptive Digital Filter," IEEE Transactions on Circuits and Systems, Jan. 1988, pp. 127-131, vol. 35, No. 1, IEEE, Piscataway, New Jersey, USA.

* cited by examiner

*Primary Examiner* — Rahel Guarino
(74) *Attorney, Agent, or Firm* — Paradice and Li LLP

(57) ABSTRACT

An equalizer circuit including a filter, equalization circuitry, and a filter adaptation circuit. The filter is configured to produce a linearized signal based at least in part on a received input signal and a nonlinear transfer function. The equalization circuitry is configured to filter inter-symbol interference (ISI) and detect one or more data symbols in the linearized signal. The equalization circuitry is further configured to produce an error signal indicating an amount of error in the detected data symbols. The filter adaptation circuit is configured to dynamically adjust the nonlinear transfer function of the filter based at least in part on the error signal from the equalization circuitry.

20 Claims, 8 Drawing Sheets

NONLINEAR EQUALIZER WITH NONLINEARITY COMPENSATION

TECHNICAL FIELD

Aspects of the present disclosure generally relate to integrated circuits, and specifically to nonlinearity compensation in data receivers.

BACKGROUND

Many system components and end user devices of a communication system transport data via serial transmission paths. Internally, however, the system components and end user devices process data in a parallel manner. As such, each system component and end user device is typically configured to receive serial data and convert the serial data into parallel data (without loss of information) for processing. For high-speed serial transmissions, the communication channel (e.g., printed circuit traces, copper cabling, and the like) may introduce frequency-dependent attenuation in the form of inter-symbol interference (ISI). As a result, the signal arriving at the data receiver may be severely distorted.

Equalizers are often implemented in data receivers to reduce or cancel ISI in the received signals. For example, a decision feedback equalizer (DFE) uses the decision of a received symbol, through feedback, to filter out ISI from the decision for a subsequent symbol. However, various components of the data receiver (such as the automatic gain control (AGC) or variable gain amplifier (VGA)), the transmitter, and/or the communication channel may introduce nonlinearities in the data signal. As a result, the voltage of the received signal is often a nonlinear function of the voltage that was originally transmitted. For example, signal voltages that are significantly different at the transmitter may be perceived to be substantially similar (or equal) when the signal is received by the receiver. This may affect the accuracy of symbol detection and further limit the effectiveness of the equalization circuitry.

Thus, it is desirable to reduce or mitigate nonlinearities in the received signal prior to equalization.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to equalizers and methods of their operation. An equalizer circuit includes a filter, equalization circuitry, and a filter adaptation circuit. The filter is configured to produce a linearized signal based at least in part on a received input signal and a nonlinear transfer function. The equalization circuitry is configured filter inter-symbol interference (ISI) and to detect one or more data symbols in the linearized signal. The equalization circuitry is further configured to produce an error signal indicating an amount of error in the detected data symbols. The filter adaptation circuit is configured to dynamically adjust the nonlinear transfer function of the filter based at least in part on the error signal from the equalization circuitry.

In some implementations, the filter may include a first multiplier, a first filter tap, a second filter tap, and an adder. The first multiplier may produce a first polynomial signal by multiplying the input signal with itself. The first filter tap may provide a scaled input signal by multiplying the input signal by a first scalar quantity. The second filter tap may provide a scaled first polynomial signal by multiplying the first polynomial signal by a second scalar quantity. The adder may sum the scaled input signal and the first polynomial signal, where the linearized signal is based at least in part on the sum. In some embodiments, the filter adaptation circuit may be configured to selectively adjust at least one of the first or second scalar quantities based at least in part on the error signal. In some other embodiments, the filter adaptation circuit may determine each of the first and second scalar quantities based on a least mean square of the error signal.

In some implementations, the filter may further include a second multiplier to produce a second polynomial signal by multiplying the first polynomial signal with the input signal and a third filter tap to provide a scaled second polynomial signal by multiplying the second polynomial signal by a third scalar quantity. The adder is further configured to sum the scaled input signal, the scaled first polynomial signal, and the scaled second polynomial signal to produce the linearized signal. In some embodiments, the filter adaptation circuit may be further configured to selectively adjust at least one of the first, second, or third scalar quantities based at least in part on the error signal. In some other embodiments, the filter adaptation circuit may determine each of the first, second, and third scalar quantities based at least in part on a least mean square of the error signal.

An example method of equalization is also disclosed. The method may include receiving an input signal; generating a linearized signal based at least in part on the received input signal and a nonlinear transfer function; filtering ISI in the linearized signal; detecting one or more data symbols in the filtered signal; generating an error signal indicating an amount of error in the detected data symbols; and dynamically adjusting the nonlinear transfer function based at least in part on the error signal.

In some implementations, the step of generating the linearized signal may include steps of multiplying the input signal with itself to produce a first polynomial signal; multiplying the input signal by a first scalar quantity to produce a scaled input signal; multiplying the first polynomial signal by a second scalar quantity to produce a scaled first polynomial signal; and summing the scaled input signal and the scaled first polynomial signal, where the linearized signal is based at least in part on the sum. In some embodiments, the step of dynamically adjusting the nonlinear transfer function may include a step of selectively adjusting at least one of the first or second scalar quantities based at least in part on the error signal.

In some implementations, the step of generating the linearized signal may further include steps of multiplying the first polynomial signal with the input signal to produce a second polynomial signal and multiplying the second polynomial signal by a third scalar quantity to produce a scaled second polynomial signal. Further, the scaled second polynomial signal may be added to the sum of the scaled input signal and the scaled first polynomial signal. In some embodiments, the step of dynamically adjusting the nonlinear transfer function may include a step of selectively adjusting at least one of the first, second, or third scalar quantities based at least in part on the error signal.

Another example equalizer circuit may include a filter configured to receive an input signal, equalization circuitry, and a filter adaptation circuit. The filter includes a first multiplier to produce a first polynomial signal by multiplying the input signal with itself; a first filter tap to provide a scaled input signal by multiplying the input signal by a first scalar quantity; a second filter tap to provide a scaled first polynomial signal by multiplying the first polynomial signal by a second scalar quantity; and an adder to produce a linearized signal based at least in part on a sum of the scaled input signal and the scaled first polynomial signal. The equalization circuitry is configured to filter ISI and detect one or more data symbols in the linearized signal. The equalization circuitry is further configured to produce an error signal indicating an amount of error in the detected data symbols. The filter adaptation circuit is configured to dynamically adjust the first and second scalar quantities based at least in part on the error signal.

In some implementations, the filter may further include a second multiplier to produce a second polynomial signal by multiplying the first polynomial signal with the input signal and a third filter tap to provide a scaled second polynomial signal by multiplying the second polynomial signal by a third scalar quantity. The adder is configured to produce the linearized signal by summing the scaled input signal, the scaled first polynomial signal, and the scaled second polynomial signal. In some embodiments, the filter adaptation circuit may be further configured to selectively adjust at least one of the first, second, or third scalar quantities based at least in part on the error signal.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components.

The example embodiments are not to be construed as limited to specific examples described herein but rather to include within their scope all embodiments defined by the appended claims.

Figure 1:
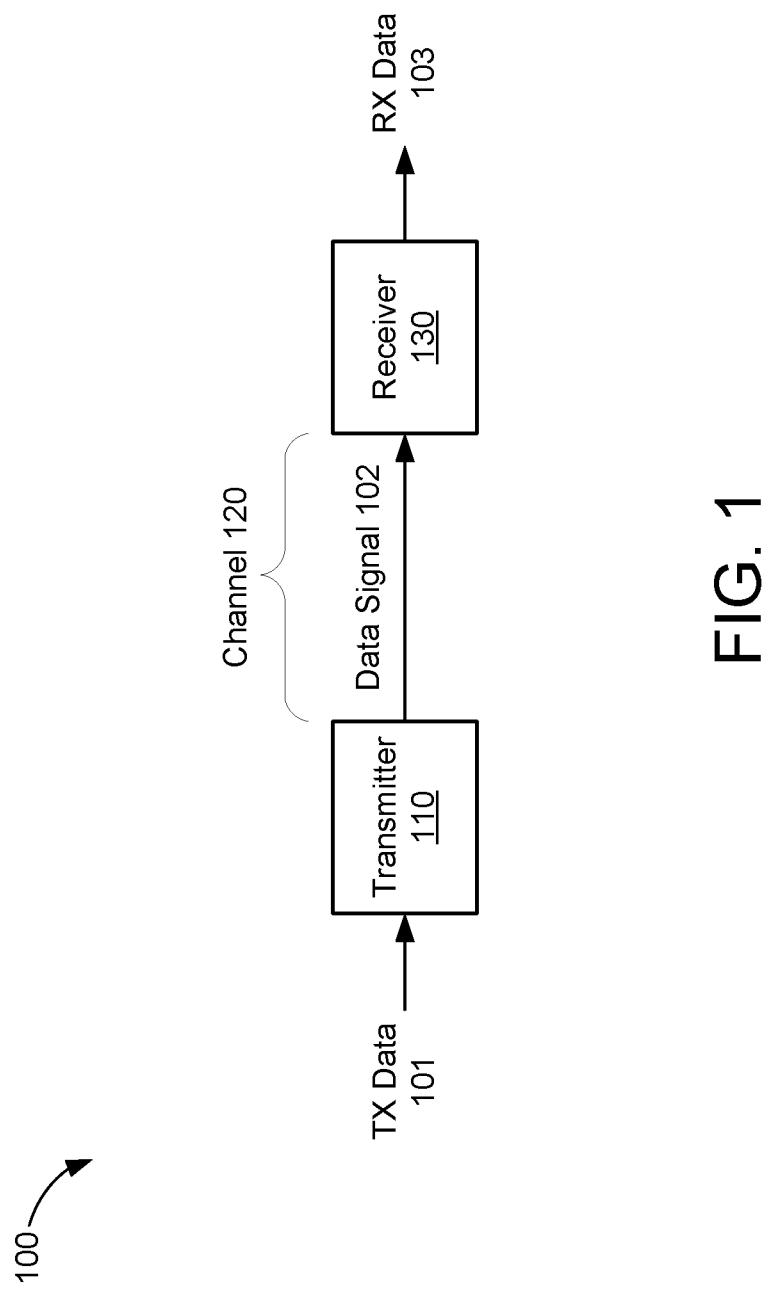
FIG. 1 is a block diagram of an example communication system.

FIG. 1 is a block diagram of an example communication system 100. The communication system 100 includes a transmitter 110 coupled to a receiver 130 via a communication channel 120. In some embodiments, the communication system 100 may be a serial communication system. For example, the transmitter 110 may be part of a serializer-deserializer (SerDes) and the receiver 130 may be part of a different SerDes. The communication channel 120 may form an electrical path between the transmitter 110 and the receiver 130. For example, the communication channel 120 may include one or more printed circuit board (PCB) traces, vias, cables, connectors, decoupling capacitors, and the like. In some implementations, the transmitter 110 and the receiver 130 may be disposed on separate integrated circuits.

The transmitter 110 may drive serial data 101 onto the communication channel 120, as a data signal 102, using a digital baseband modulation technique. In some implementations, the data signal 102 may carry one or more data symbols that correspond to the serial data 101. For example, the transmitter 110 may convert each symbol into an analog voltage mapped to that particular symbol. In some aspects, the transmitter 110 may use a binary non-return-to-zero (NRZ) modulation scheme to map the data symbols to analog voltages (e.g., where each symbol represents one bit of the serial data and two analog voltages are used to represent each bit). In some other aspects, the transmitter 110 may use multi-level digital baseband modulation techniques (e.g., where each symbol includes a plurality of bits of the serial data and more than two analog voltages are used to represent each bit). Accordingly, the voltage level(s) of the data signal 102 may correspond to the data symbols representing the transmitted data 101.

The receiver 130 receives the data signal 102 via the communication channel 120. In some implementations, the receiver 130 may include clock and data recovery (CDR) circuitry to recover digital data 103 carried by the analog data signal 102. For high-speed serial transmissions, the communication channel 120 may introduce frequency-dependent attenuation in the form of inter-symbol interference (ISI). As a result, the data signal 102 may be severely distorted when it arrives at the receiver 130. In some embodiments, the receiver 130 may include equalization circuitry to reduce or cancel ISI in the receive data signal 102. For example, the receiver 130 may include a decision feedback equalizer (DFE) which uses the decision of a received symbol, through feedback, to filter out ISI from the decision for a subsequent symbol. However, aspects of the communication system 100 (such as one or more properties or components of the transmitter 110, channel 120, and/or receiver 130) may introduce nonlinearities into the data signal 102 which may affect the decisions for received symbols and thus limit the effectiveness of the equalization circuitry.

Figure 2:
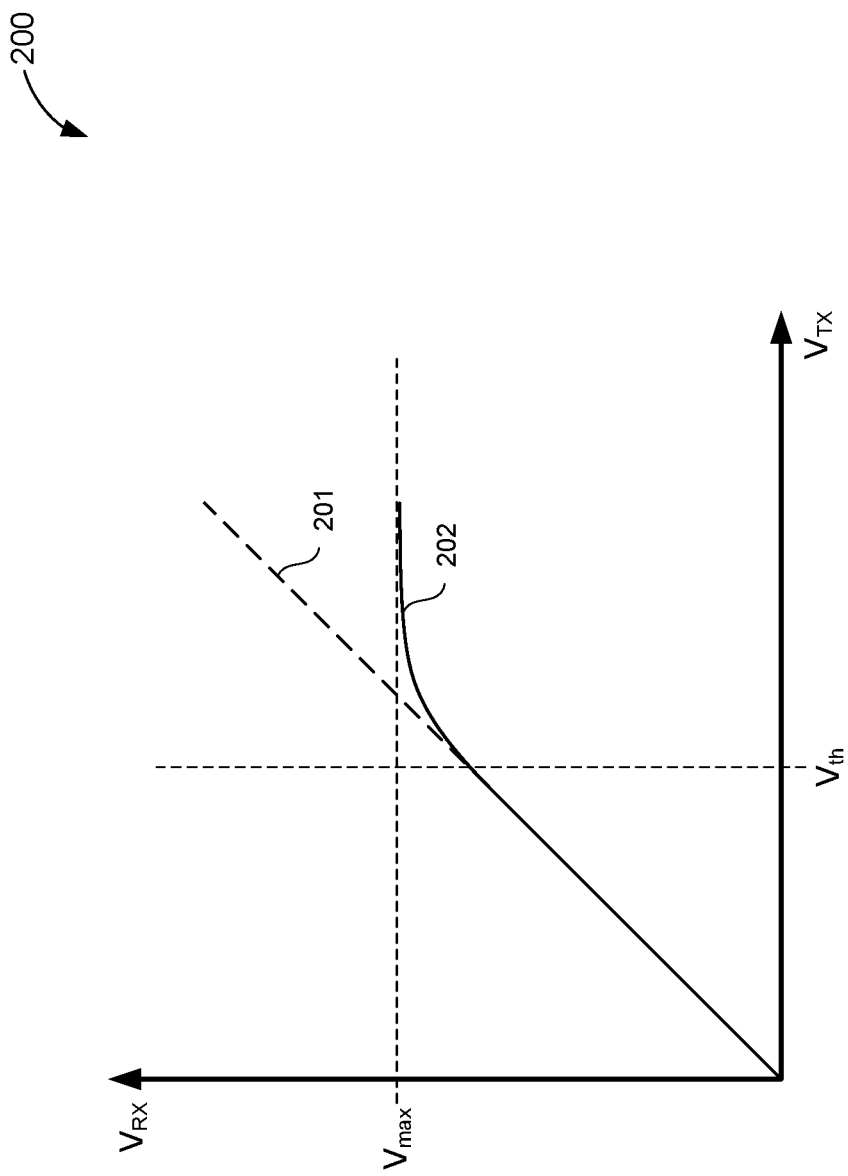
FIG. 2 is a graph of the received voltage relative to the transmitted voltage of data signal in an example communication system.

FIG. 2 is a graph 200 of the received voltage relative to the transmitted voltage of data signal in an example communication system. With reference for example to FIG. 1, the horizontal axis of the graph 200 represents the transmit voltage ($V_{TX}$) of the transmitter 110 and the vertical axis of the graph 200 represents the receive voltage ($V_{RX}$) of the receiver 130. A first curve 201 depicts an ideal (linear) relationship between the peak transmit voltage $V_{TX}$ of the data signal 102 and the peak receive voltage $V_{RX}$ of the data signal 102. A second curve 202 depicts the actual relationship between the peak transmit voltage $V_{TX}$ of the data signal 102 and the peak receive voltage $V_{RX}$ of the data signal 102. It is noted, with respect to the second curve 202, that the receive voltage $V_{RX}$ of the data signal 102 varies substantially linearly in proportion to the transmit voltage $V_{TX}$ up to a threshold voltage level ($V_{th}$). For transmit voltages $V_{TX}$ that exceed the threshold voltage $V_{th}$, the receive voltage $V_{RX}$ of the data signal 102 tapers off to a maximum voltage level ($V_{max}$). In other words, the receive voltage $V_{RX}$ of the data signal 102 varies nonlinearly in proportion to the transmit voltage $V_{TX}$ beyond the threshold voltage level $V_{th}$.

Nonlinearities in the data signal 102 may be attributed to the characteristics and/or properties of various components of the communication system 100. For example, the data signal 102 loses power or energy as it propagates through the communication channel 120. Thus, the receiver 130 typically includes one or more amplifiers to boost the power of the received signal so that the data symbols can be recovered more easily and/or accurately. However, in some instances, the amplifiers in the receiver 130 (such as low noise amplifiers (LNAs), variable gain amplifiers (VGAs), and the like) may saturate, thus preventing the amplifiers from amplifying the received data signal 102 beyond the maximum voltage level $V_{max}$. It is noted that various other components of the communication system 100 (such as within the transmitter 110, the communication channel 120, and/or the receiver 130) may also introduce nonlinearities in the data signal 102.

As shown in FIG. 2, a significant increase in the signal voltage at the transmitter (e.g., for $V_{TX} > V_{th}$) may result in only a slight increase in the signal voltage at the receiver. This nonlinear relationship between the transmitted voltage $V_{TX}$ of the data signal 102 and the received voltage $V_{RX}$ may affect the accuracy of data symbol detection by the receiver 130, which may further limit the effectiveness of the equalization circuitry in shaping and/or reducing ISI in the received data signal 102. Thus, in some implementations, the receiver 130 may include a nonlinear filter to reduce or mitigate nonlinearities in the received signal prior to equalization and/or symbol detection. For example, the nonlinear filter may provide a nonlinear transfer function to "linearize" the relationship between the received voltage $V_{RX}$ and the transmitted voltage $V_{TX}$ of the data signal 102. More specifically, the output of the nonlinear filter may be a nonlinear function of the input. As a result, the nonlinear filter may counteract the nonlinearities inherent in the received data signal 102 so that the relationship between the received voltage $V_{RX}$ and the transmitted voltage $V_{TX}$ is more similar to that of the first curve 201 depicted in the graph 200.

Some nonlinear filters are implemented using lookup tables (LUTs), which typically require a priori knowledge of the nonlinearities in the received data signal. However, the nonlinearities introduced by a communication system are often difficult to predict. Moreover, the nonlinearities may also change over time (e.g., with respect to changes in system components and/or operating conditions). Thus, aspects of the present disclosure provide an adaptive nonlinear filter that can dynamically change its nonlinear transfer function to adapt to the nonlinearities in a received data signal.

Figure 3:
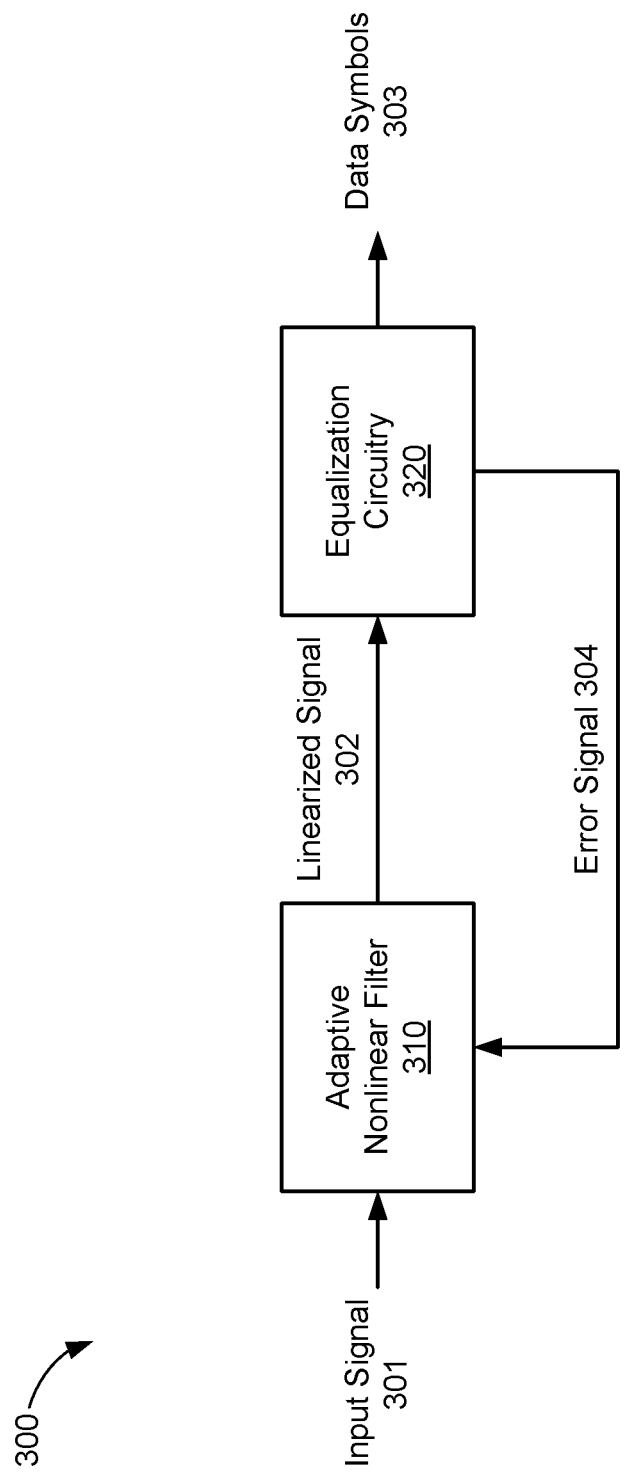
FIG. 3 is a block diagram of an equalizer circuit including an adaptive nonlinear filter, in accordance with some embodiments.

FIG. 3 is a block diagram of an equalizer circuit 300 including an adaptive nonlinear filter, in accordance with some embodiments. The equalizer circuit 300 may be implemented in a data receiver (such as the receiver 130 of FIG. 1) to recover one or more data symbols 303 from a received input signal 301. The equalizer circuit 300 includes an adaptive nonlinear filter 310 and equalization circuitry 320.

The adaptive nonlinear filter 310 is configured to receive the input signal 301 and produce a linearized signal 302 based on the input signal 301. For example, the input signal 301 may correspond to a data signal (e.g., data signal 102) sent by a transmitter over a communication channel. As described above, various components of the communication system may introduce nonlinearities in the data signal. Thus, the adaptive nonlinear filter 310 may compensate for such nonlinearities in the received input signal 301. In some implementations, the adaptive nonlinear filter 310 may provide a nonlinear transfer function. Thus, the linearized signal 302 may be a nonlinear function of the input signal 301. More specifically, the adaptive nonlinear filter 310 may counteract the nonlinearities inherent in the input signal 301 so that the linearized signal 302 has a more linear relationship with respect to the data signal that was originally transmitted (e.g., by the transmitter 110 of FIG. 1). In some embodiments, the adaptive nonlinear filter 310 may use feedback from the equalization circuitry 320 to dynamically change or update its transfer function. For example, the feedback may indicate an accuracy or effectiveness of the nonlinear transfer function in modeling the actual nonlinearities introduced by the communication system.

The equalization circuitry 320 is configured to receive the linearized signal 302 from the filter 310 and detect the data symbols 303 from the linearized signal 302. For example, the equalization circuitry 320 may compare the voltage of the linearized signal 302 with one or more voltage thresholds associated with known data symbols and may determine each of the data symbols 303 based on the comparison. In some implementations, the equalization circuitry 320 may perform equalization on the linearized signal 302 (e.g., by shaping and/or reducing ISI in the signal) prior to symbol detection. In some other implementations, the equalization circuitry 320 may further output an error signal based, at least in part, on a result of the symbol detection. For example, the error signal may indicate an amount of error or difference between the actual voltage (e.g., of the linearized signal 302) resulting in the detection of each of the data symbols 303 and the expected voltage for each symbol.

In some embodiments, the error signal 304 from the equalization circuitry 320 may be provided, as feedback, to the adaptive nonlinear filter 310. The adaptive nonlinear filter 310 may use the information from the error signal to dynamically adjust its nonlinear transfer function. For example, data symbols with large errors (e.g., large discrepancies between the actual and expected voltage for that data symbol) may be a result of poor linearization of the linearized signal 302 and may therefore necessitate adjustments to the nonlinear transfer function for the associated voltages. Accordingly, the adaptive nonlinear filter 310 may provide a nonlinear transfer function that more accurately models the actual nonlinearities in the input signal 301 and adapts to changes in the nonlinearities at any given time.

Figure 4:
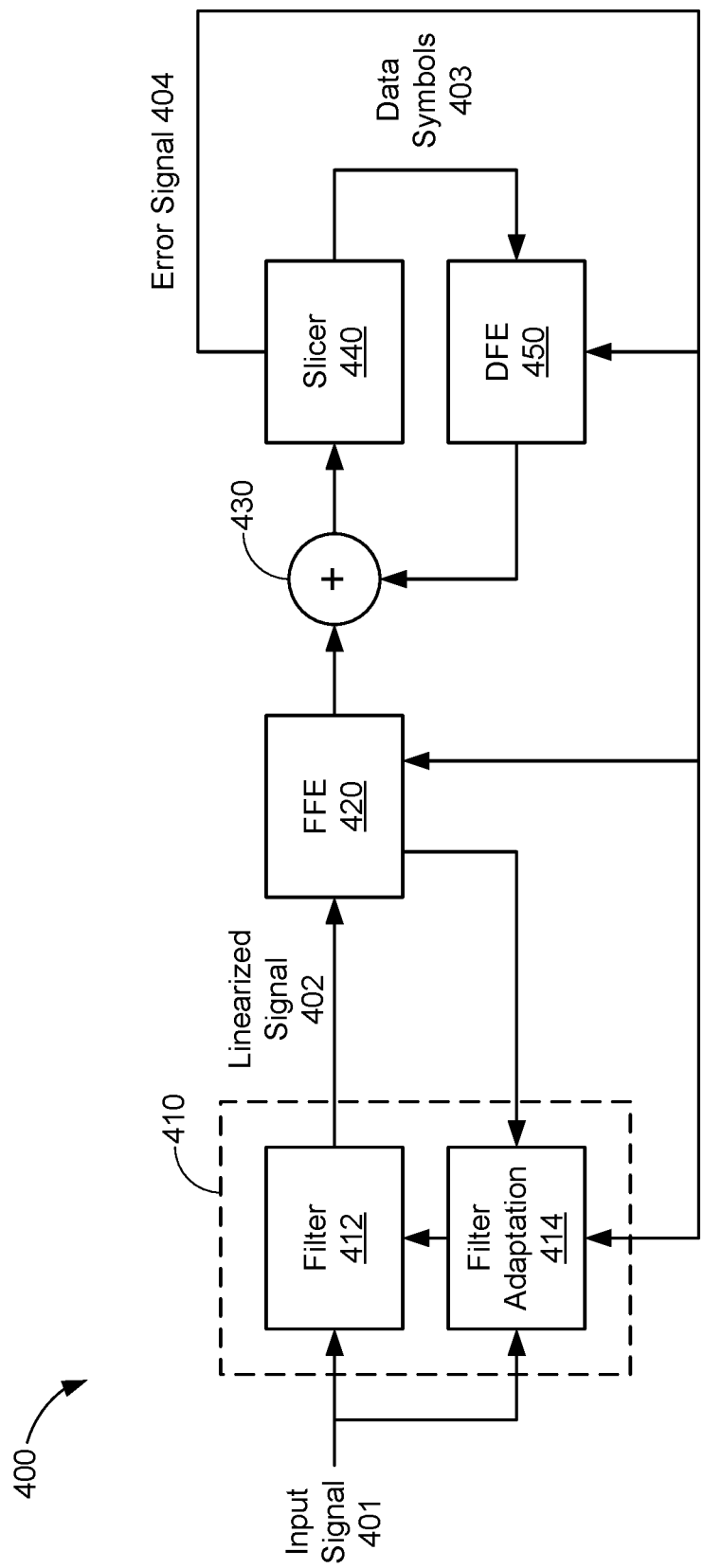
FIG. 4 is a block diagram of a nonlinear equalizer circuit with nonlinearity compensation, in accordance with some embodiments.

FIG. 4 is a block diagram of a nonlinear equalizer circuit 400 with nonlinearity compensation, in accordance with some embodiments. The equalizer circuit 400 may be an example embodiment of the equalizer circuit 300 of FIG. 3. Thus, the equalizer circuit 400 may be implemented in a data receiver (such as the receiver 130 of FIG. 1) to recover one or more data symbols 403 from a received input signal 401. The nonlinear equalizer circuit 400 includes an adaptive nonlinear filter 410, a feed-forward equalizer (FFE) 420, a slicer 440, and a decision-feedback equalizer (DFE) 450.

The adaptive nonlinear filter 410 is configured to receive the input signal 401 and produce a linearized signal 402 based on the input signal 401. In some aspects, the adaptive nonlinear filter 410 may be an example embodiment of the adaptive nonlinear filter 310 of FIG. 3. Thus, the adaptive nonlinear filter 410 may compensate for nonlinearities in a data signal received (from a transmitter) over a communication channel. More specifically, the adaptive nonlinear filter 410 may counteract the nonlinearities inherent in the input signal 401 so that the linearized signal 402 has a more linear relationship with respect to the data signal that was originally transmitted. In some embodiments, the adaptive nonlinear filter 410 may include a filter component 412 and filter adaptation circuitry 414. The filter component 412 may provide the nonlinear transfer function for the adaptive nonlinear filter 410 (e.g., where the linearized signal 402 is a nonlinear function of the input signal 401). The filter adaptation circuitry 414 may dynamically adjust or update the transfer function of the filter component 412 to more accurately model the nonlinearities in the input signal 401 and/or adapt to changes in the nonlinearities at any given time.

The FFE 420, slicer 440, and DFE 450 may collectively be an example embodiment of the equalization circuitry 320 of FIG. 3. The FFE 420 performs linear equalization on the linearized signal 402. For example, the FFE 420 may operate as a high-pass filter to compensate for any low-pass characteristics of the communication channel. The slicer 440 generates decisions representing the data symbols 403 based on the voltages of the equalized signal. For example, the slicer 440 may compare the voltage of the equalized signal with one or more voltage thresholds associated with known data symbols to determine the appropriate data symbols. The DFE 450 performs nonlinear equalization on the linearized signal 402 based, at least in part, on the data symbols 403 recovered by the slicer 440. For example, the output of the DFE 450 may be combined with the output of the FFE 420, via an adder 430, to remove post-cursor ISI from the equalized signal that is provided as an input to the slicer 440.

In the example of FIG. 4, the slicer 440 may further produce an error signal 404 based, at least in part, on a result of the symbol detection. As described above, the error signal 404 may indicate an amount of error or difference between the actual voltage (e.g., of the equalized signal) resulting in the detection of each of the data symbols 403 and the expected voltage for each symbol. In some implementations, the error signal 404 may be used to update or adjust the equalizer taps of the FFE 420 and/or DFE 450. For example, each of the FFE 420 and DFE 450 may apply a respective equalization vector ($\vec{W}$) to the input signal via a tapped delay line (not shown for simplicity).

The FFE 420 may update the taps of its equalization vector (($\vec{W}_{FFE}$) based on the error (e) indicated by the error signal 404, according to the following equation:

$$\vec{W}_{FFE}(n+1) = \vec{W}_{FFE}(n) - u_{FFE} e(n) \vec{X}_{FFE}$$

where $\vec{X}_{FFE}$ is the delay line vector (e.g., input) of the FFE 420 and $u_{FFE}$ is the step size of each equalizer tap update.

The DFE 450 may also update the taps of its equalization vector ($\vec{W}_{DFE}$) based on the error (e) indicated by the error signal 404, according to the following equation:

$$\vec{W}_{DFE}(n+1) = \vec{W}_{DFE}(n) + u_{DFE} e(n) \vec{X}_{DFE}$$

where $\vec{X}_{DFE}$ is the delay line vector (e.g., input) of the FFE 420 and $u_{DFE}$ is the step size of each equalizer tap update.

In some embodiments, the filter adaptation circuitry 414 may adjust the nonlinear transfer function of the filter 412 based, at least in part, on the input signal 401, the equalizer tap coefficients (($\vec{W}_{FFE}$) of the FFE 420, and the error signal 404 from the slicer 440. For example, data symbols with large errors (e.g., large discrepancies between the actual and expected voltage for that data symbol) may be a result of poor linearization of the linearized signal 402 and may therefore necessitate adjustments to the nonlinear transfer function for the associated voltages. In some embodiments, the filter adaptation circuitry 414 may dynamically adjust or update one or more filter coefficients of the filter component 412 to further reduce the error (e) indicated in the error signal 404.

Figure 5:
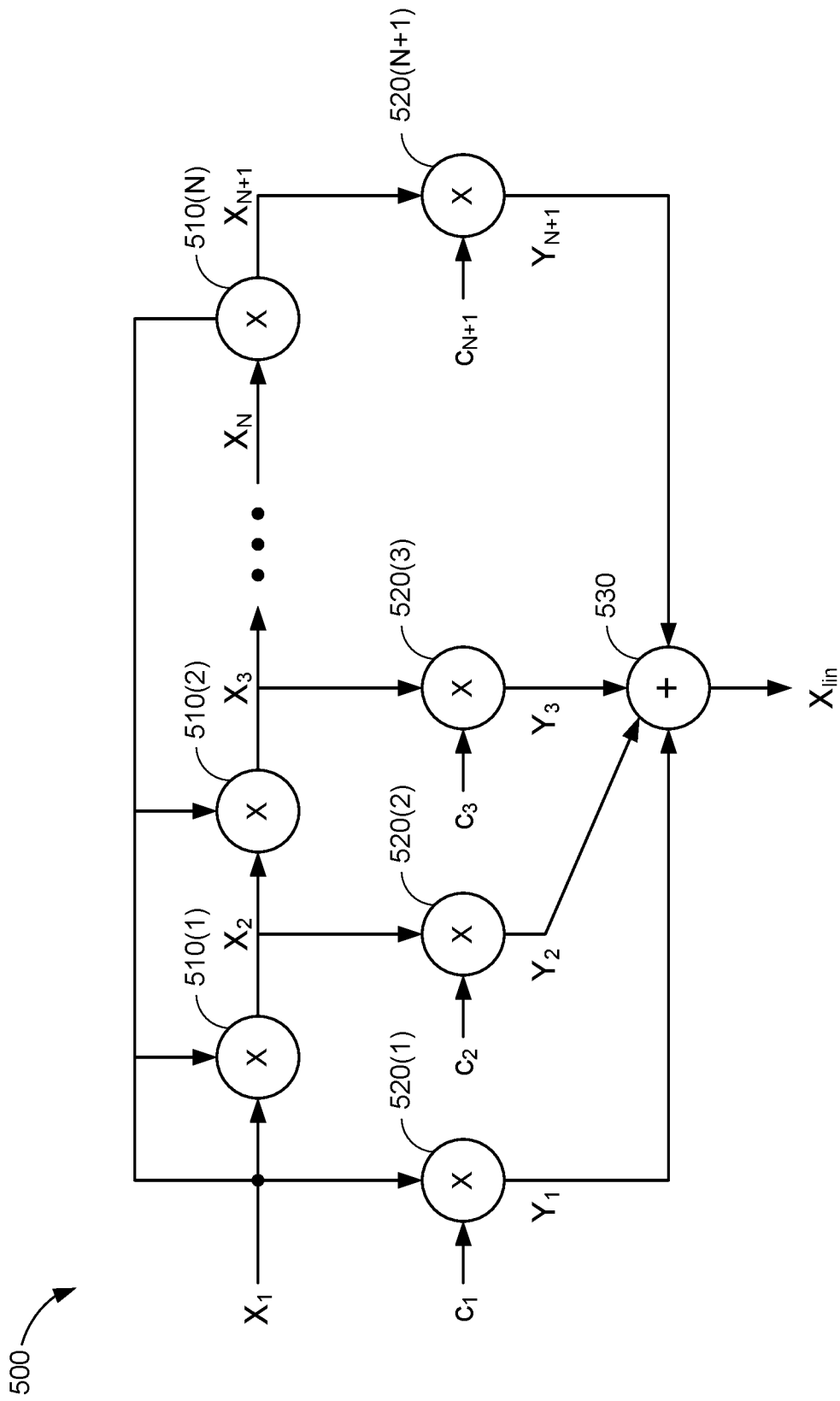
FIG. 5 is a block diagram of an adaptive nonlinear filter, in accordance with some embodiments.

FIG. 5 is a block diagram of an adaptive nonlinear filter 500, in accordance with some embodiments. The filter 500 may be an example embodiment of the filter component 412 of FIG. 4. Thus, in some embodiments, the adaptive nonlinear filter 500 may provide a nonlinear transfer function (e.g., where the output of the filter 500 is a nonlinear function of the input).

With reference to FIG. 2, it is noted that the voltage of a received data signal tends to vary linearly with respect to the transmitted voltage for relatively low transmit voltages (e.g., $V_{TX} < V_{th}$) and approaches saturation at higher transmit voltages (e.g., $V_{TX} > V_{th}$). Thus, the nonlinear transfer function should make relatively little (if any) adjustments to the input signal when the voltage of the input signal is relatively low, and should make more substantial adjustments (e.g., amplifications) to the input signal when the voltage of the input signal is relatively high. Aspects of the present disclosure recognize that such adjustments can be modeled after a polynomial function of order n (e.g., $f(x)=x^n$), where n is greater than 1. Thus, in some embodiments, the adaptive nonlinear filter 500 may produce a linearized output signal by multiplying the input signal with itself one or more times.

In the example of FIG. 5, the adaptive nonlinear filter 500 includes a number of multipliers 510(1)-510(N), a number of filter taps 520(0)-520(N), and an adder 530. Each of the multipliers 510($i$) produces an $(i+1)^{th}$ order polynomial signal based on a received input signal $X_1$ (e.g., where i=1, 2, 3, . . . , N). For example, the first multiplier 510(1) produces a $2^{nd}$ order polynomial signal $X_2$ by multiplying the input signal $X_1$ with itself (e.g., $X_2=X_1^2$), the second multiplier 510(2) produces a $3^{rd}$ order polynomial signal $X_3$ by multiplying the input signal $X_1$ with the second-order polynomial signal $X_2$ (e.g., $X_3=X_1*X_2=X_1^3$), and the $N^{th}$ multiplier 510(N) produces a $(N+1)^{th}$ order polynomial signal $X_{N+1}$ by multiplying the input signal $X_1$ with the $N^{th}$ order polynomial signal (e.g., $X_{N+1}=X_1*X_N=X_1^{N+1}$).

The filter taps 520(1)-520(N+1) may scale the signals $X_1$-$X_{N+1}$ so that they can be combined to form a linearized representation of the input signal $X_1$. More specifically, each of the filter taps 520($k$) produces a scaled component signal $Y_k$ by multiplying a corresponding signal $X_k$ by a respective scalar quantity $c_k$ (e.g., where k=1, 2, 3, . . . , N+1). For example, the first filter tap 520(1) produces a first component signal $Y_1$ by multiplying the input signal $X_1$ by a first scalar quantity $c_1$ (e.g., $Y_1=c_1X_1$), the second filter tap 520(2) produces a second component signal $Y_2$ by multiplying the $2^{nd}$ order polynomial signal $X_2$ by a second scalar quantity $c_2$ (e.g., $Y_2=c_2X_2$), the third filter tap 520(3) produces a third component signal $Y_3$ by multiplying the $3^{rd}$ order polynomial signal $X_3$ by a third scalar quantity $c_3$ (e.g., $Y_3=c_3X_3$), and the $(N+1)^{th}$ filter tap 520(N+1) produces an $(N+1)^{th}$ component signal $Y_{N+1}$ by multiplying the $(N+1)^{th}$ order polynomial signal by a $(N+1)^{th}$ scalar quantity $c_{N+1}$ (e.g., $Y_{N+1}=c_{N+1}X_{N+1}$).

The adder 530 combines the component signals $Y_1$-$Y_{N+1}$ to produce a linearized output signal $X_{lin}$. As shown in FIG. 5, the linearized output signal $X_{lin}$ may be generated by summing the component signals $Y_1$-$Y_{N+1}$. Thus, each of the scalar quantities $c_1$-$c_{N+1}$ may be assigned a value between 0 and 1. With reference for example to FIG. 4, the filter adaptation circuitry 414 may selectively adjust the scalar quantities $c_1$-$c_{N+1}$ based, at least in part, on by the error signal 404. More specifically, in some embodiments, the filter adaptation circuitry 414 may determine each of the scalar quantities $c_1$-$c_{N+1}$ based on a least mean square (LMS) of the error signal 404. For example, the filter adaptation circuitry 414 may derive each of the scalar quantities $c_1$-$c_{N+1}$ using the error (e) indicated by the error signal 404, according to the following equation:

$$c_i(n+1)=c_i(n)-u_c e(n)\vec{X}_i(n)\vec{W}_{FFE}(n)$$

where $\vec{X}_i$ is the delay line vector (e.g., input) of the adaptive nonlinear filter 500 which stores the $i^{th}$ order of x (e.g., i=1, 2, 3, ..., N), $\vec{W}_{FFE}$ is the equalization vector of the FFE 420, and $u_c$ is the step size of each filter tap update. In the example of FIG. 4, the linearized output signal $X_{lin}$ may be provided as an input to the FFE 420 (e.g., as the linearized signal 402). Thus, in some implementations, the delay line vector $\vec{X}_{FFE}$ may be expressed as:

$$\vec{X}_{FFE}=\sum_{k=1}^{N+1}Y_k=\sum_{i=1}^{N+1}c_i\vec{X}_i$$

The filter adaptation circuitry 414 may be implemented in hardware, software, firmware, or any combination thereof. In some aspects, the filter component 412 and filter adaptation circuitry 414 may be implemented together in an integrated logic device. In other aspects, the filter component 412 and filter adaptation circuitry 414 may be implemented separately, as discrete but interoperable logic devices. If implemented in software, the filter adaptation operations may be realized at least in part by a non-transitory processor-readable storage medium storing instructions that, when executed by a processor, performs one or more of the operations described above. The term "processor," as used herein, may refer to any general-purpose processor, conventional processor, controller, microcontroller, and/or state machine capable of executing scripts or instructions of one or more software programs stored in memory.

Figure 6:
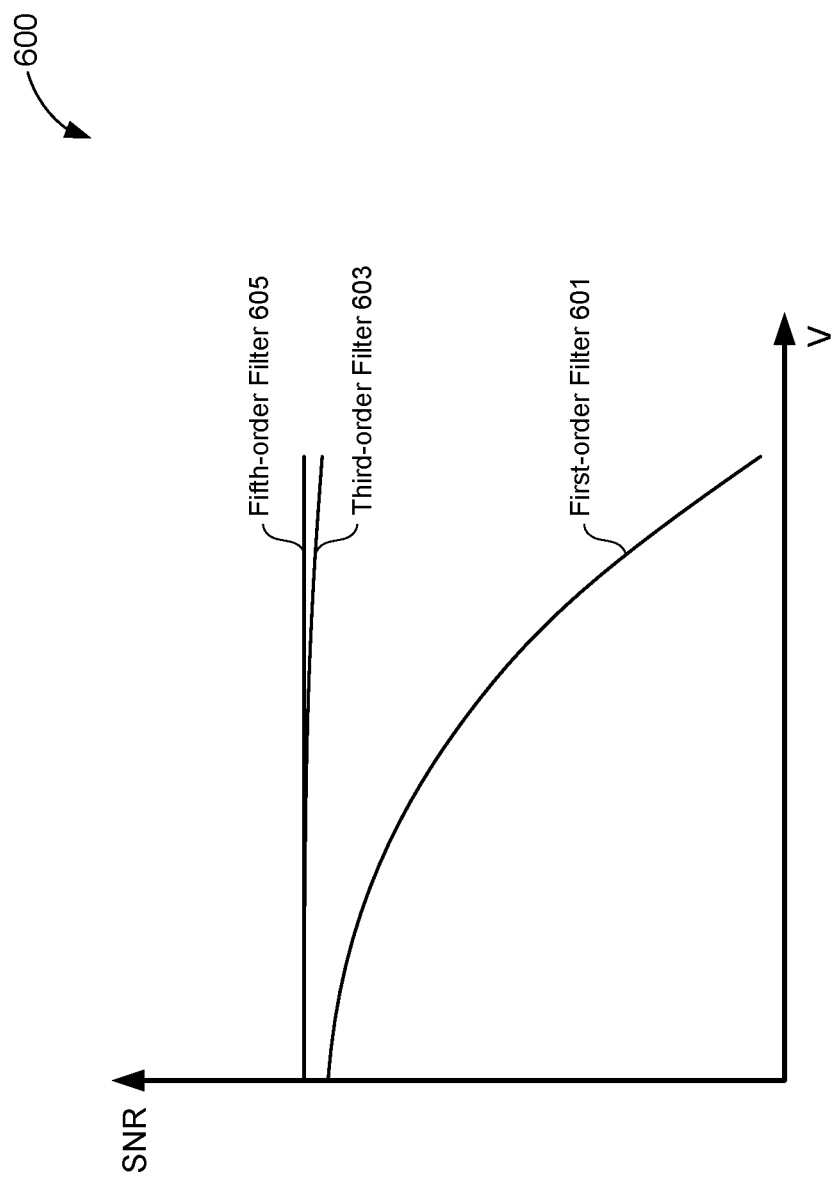
FIG. 6 is a graph of the signal-to-noise ratio (SNR) relative to the voltage of linearized signals produced by example configurations of an adaptive nonlinear filter.

FIG. 6 is a graph 600 of the signal-to-noise ratio (SNR) relative to the voltage (V) of linearized signals produced by example configurations of an adaptive nonlinear filter. More specifically, the graph 600 shows three example mappings of the SNR response 601, 603, and 605 for a first-order nonlinear filter, a third-order nonlinear filter, and a fifth-order nonlinear filter, respectively. It is noted that odd-numbered polynomial signals tend to provide the greatest contribution (e.g., change) to the linearized output signal $X_{lin}$. Thus, in some aspects, the even-numbered polynomial coefficients $c_i$ may be set to zero (e.g., $c_i=0$ for even values of i).

With reference for example to FIG. 6, a first-order filter may produce the linearized signal $X_{lin}$ based only on the 1st order input signal $X_i$ (e.g., $X_{lin}=c_1X_1$). Thus, the output of the first-order filter is effectively the same as the input signal X1 (e.g., without linearization). A third-order filter may produce the linearized signal $X_{lin}$ based on the $1^{st}$ order input signal $X_1$, the $2^{nd}$ order polynomial signal $X_2$, and the $3^{rd}$ order polynomial signal $X_3$ (e.g., $X_{lin}=c_1X_1+c_2X_2+c_3X_3$). A fifth-order filter may produce the linearized signal $X_{lin}$ based on the $1^{st}$ order input signal $X_i$, the $2^{nd}$ order polynomial signal $X_2$, the $3^{rd}$ order polynomial signal $X_3$, the $4^{th}$ order polynomial signal $X_4$, and the $5^{th}$ order polynomial signal $X_5$ (e.g., $X_{lin}=c_1X_1+c_2X_2+c_3X_3+c_4X_4+c_5X_5$).

As shown in FIG. 6, the SNR response 601 for the first-order filter drops significantly with increasing voltage levels. In contrast, the SNR response 603 for the third-order filter starts higher (e.g., at V=0) and decreases at a much slower rate with increasing voltage levels. More specifically, as shown in FIG. 6, the SNR response curve for the third-order filter response remains relatively flat (e.g., does not change) until the voltage of the received signal reaches a relatively high voltage level, at which point the SNR response 603 begins to taper downward. It is noted that the SNR response 605 starts high and remains relatively constant across all voltage levels.

Thus, as shown in FIG. 6, the SNR response of the received input signal improves with higher-order polynomial signals. However, higher-order filters also tend to be more complex and/or expensive to implement. Thus, it may be desirable to balance the trade-offs between the SNR of the input signal and the complexity of the filter. For example, a third-order filter significantly improves the SNR of the received signal over that of a first-order filter (e.g., the unfiltered input signal). Although a fifth-order filter may provide a slight improvement in SNR over the third-order filter, the cost and/or complexity of implementing the fifth-order filter may be substantially greater than that of the third-order filter. Accordingly, the third-order filter may be ideal for the example of FIG. 6.

Figure 7:
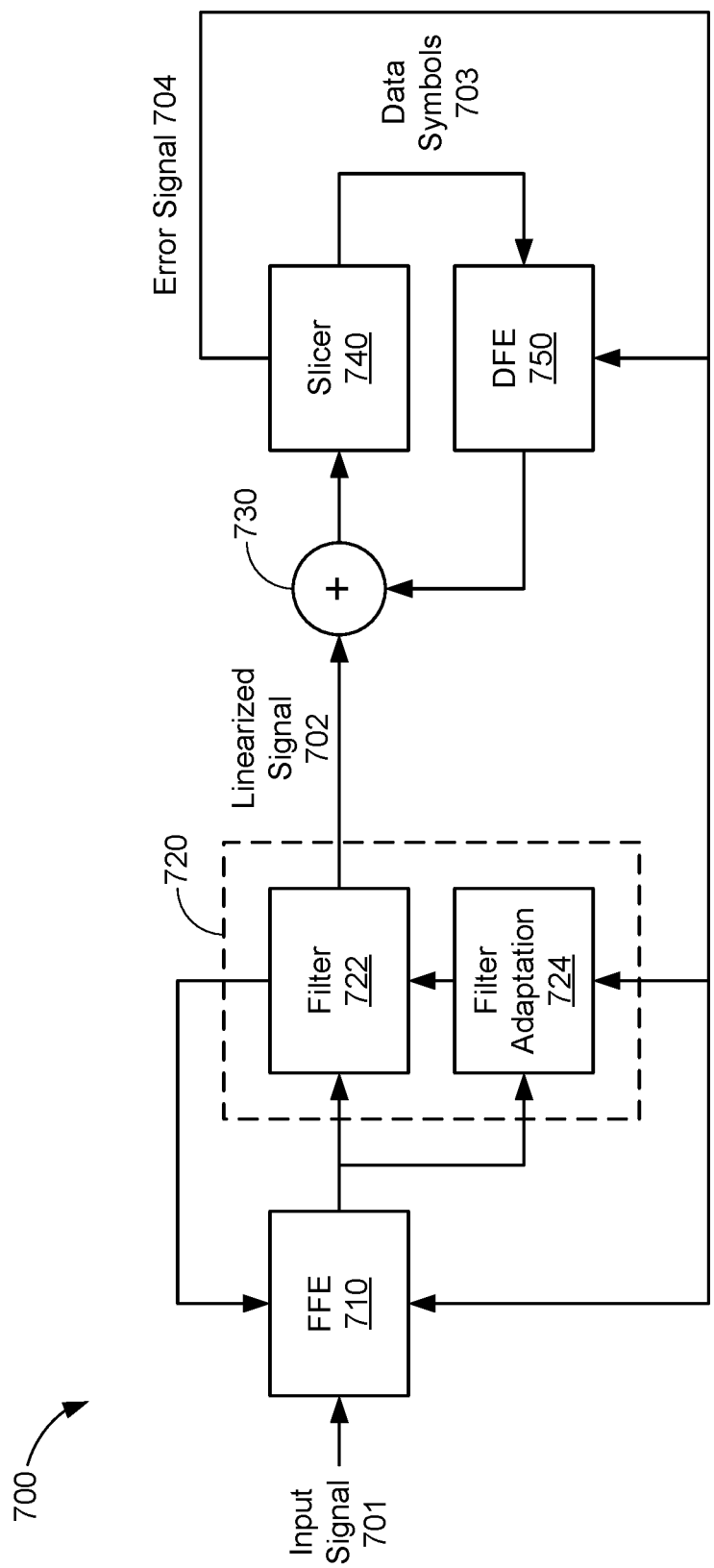
FIG. 7 is a block diagram of another nonlinear equalizer circuit with nonlinearity compensation, in accordance with some embodiments.

FIG. 7 is a block diagram of another nonlinear equalizer circuit 700 with nonlinearity compensation, in accordance with some embodiments. The equalizer circuit 700 may be an example embodiment of the equalizer circuit 300 of FIG. 3. Thus, the equalizer circuit 700 may be implemented in a data receiver (such as the receiver 130 of FIG. 1) to recover one or more data symbols 703 from a received input signal 701. The nonlinear equalizer circuit 700 includes an FFE 710, an adaptive nonlinear filter 720, a slicer 740, and a DFE 750.

The FFE 710 performs linear equalization of the received input signal 701. For example, the FFE 710 may operate as a high-pass filter to compensate for any low-pass characteristics of the communication channel. The adaptive nonlinear filter 720 receives the equalized signal from the FFE 710 and produces a linearized signal 702 based on the equalized signal. In some embodiments, the adaptive nonlinear filter 720 may include a filter component 722 and filter adaptation circuit 724. The filter component 722 may provide the nonlinear transfer function for the adaptive nonlinear filter 720 (e.g., where the linearized signal 702 is a nonlinear function of the equalized signal and/or input signal 701). For example, the filter component 722 may be an embodiment of the adaptive nonlinear filter 500 of FIG. 5. The filter adaptation circuitry 724 may dynamically adjust or update the transfer function of the filter component 722 to more accurately model the nonlinearities in the input signal 701 and/or adapt to changes in the nonlinearities at any given time (e.g., as described above with respect to FIG. 5).

The slicer 740 generates decisions representing the data symbols 703 based on the voltages of the linearized signal 702. For example, the slicer 740 may compare the voltage of the equalized signal with one or more voltage thresholds associated with known data symbols to determine the appropriate data symbols. The DFE 750 performs nonlinear equalization on the linearized signal 702 based, at least in part, on the data symbols 703 recovered by the slicer 740. For example, the output of the DFE 750 may be combined with the output of the adaptive nonlinear filter 720, via an adder 730, to remove post-cursor IS from the linearized signal 702 that is provided as an input to the slicer 740. In the example of FIG. 7, the slicer 740 may further produce an error signal 704 based, at least in part on a result of the symbol detection. As described above the error signal may indicate an amount of error or difference between the actual voltage (e.g., of the linearized signal 702) resulting in the detection of each of the data symbols 703 and the expected voltage for each symbol. In some embodiments, the error signal 704 may be used to adjust and/or update the equalizer taps of the FFE 710 and/or DFE 750.

The FFE 710 may update the taps of its equalization vector ($\vec{W}_{FFE}$) based on the error (e) indicated by the error signal 704, according to the following equation:

$$\vec{W}_{FFE}(n+1) = \vec{W}_{FFE}(n) - u_{FFE}e(n)\sum_{i=1}^{N} ic_i X_1^{i-1} \vec{X}_{FFE}$$

where $\vec{X}_{FFE}$ is the delay line vector (e.g., input) of the FFE 720, $c_i$ is the $i^{th}$ filter tap coefficient (e.g., scalar quantity) of the filter component 722, $X_1$ is the $1^{st}$ order input signal 701 to the filter component 722, and $u_{FFE}$ is the step size of each equalizer tap update.

The DFE 750 may also update the taps of its equalization vector ($\vec{W}_{DFE}$) based on the error (e) indicated by the error signal 704, according to the following equation:

$$\vec{W}_{DFE}(n+1) = \vec{W}_{DFE}(n) + u_{DFE}e(n)\vec{X}_{DFE}$$

The DFE 450 may also update the taps of its equalization vector ($\vec{W}_{DFE}$) based on the error (e) indicated by the error signal 404, according to the following equation:

$$\vec{W}_{DFE}(n+1) = \vec{W}_{DFE}(n) + u_{DFE}e(n)\vec{X}_{DFE}$$

where $\vec{X}_{DFE}$ is the delay line vector (e.g., input) of the FFE 420 and $u_{DFE}$ is the step size of each equalizer tap update.

In some other embodiments, the adaptive nonlinear filter 720 may update its filter taps ($c_i$) using the error (e) indicated by the error signal 704, according to the following equation:

$$c_i(n+1) = c_i(n) - u_c e(n)\vec{X}_i(n)$$

where $\vec{X}_i$ is the delay line vector (e.g., input) of the filter component 722 which stores the $i^{th}$ order of x (e.g., i=1, 2, 3, ..., N) and $u_c$ is the step size of each filter tap update.

It is noted that the nonlinear equalizer circuit 700 is substantially similar to the nonlinear equalizer circuit 400 of FIG. 4, except that the adaptive nonlinear filter 720 is placed after the FFE 710 (e.g., the output of the FFE 710 is coupled to the input of the adaptive nonlinear filter 720. Choosing which nonlinear equalizer circuit 700 or 400 to implement may depend on where nonlinearity occurs in the system. For example, if the nonlinearity is introduced before the communication channel (e.g., in the transmitter), then the nonlinear equalizer circuit 700 may provide better performance. However, if the nonlinearity is introduced after the communication channel (e.g., in analog front end of the receiver), then the nonlinear equalizer circuit 400 may provide better performance.

Figure 8:
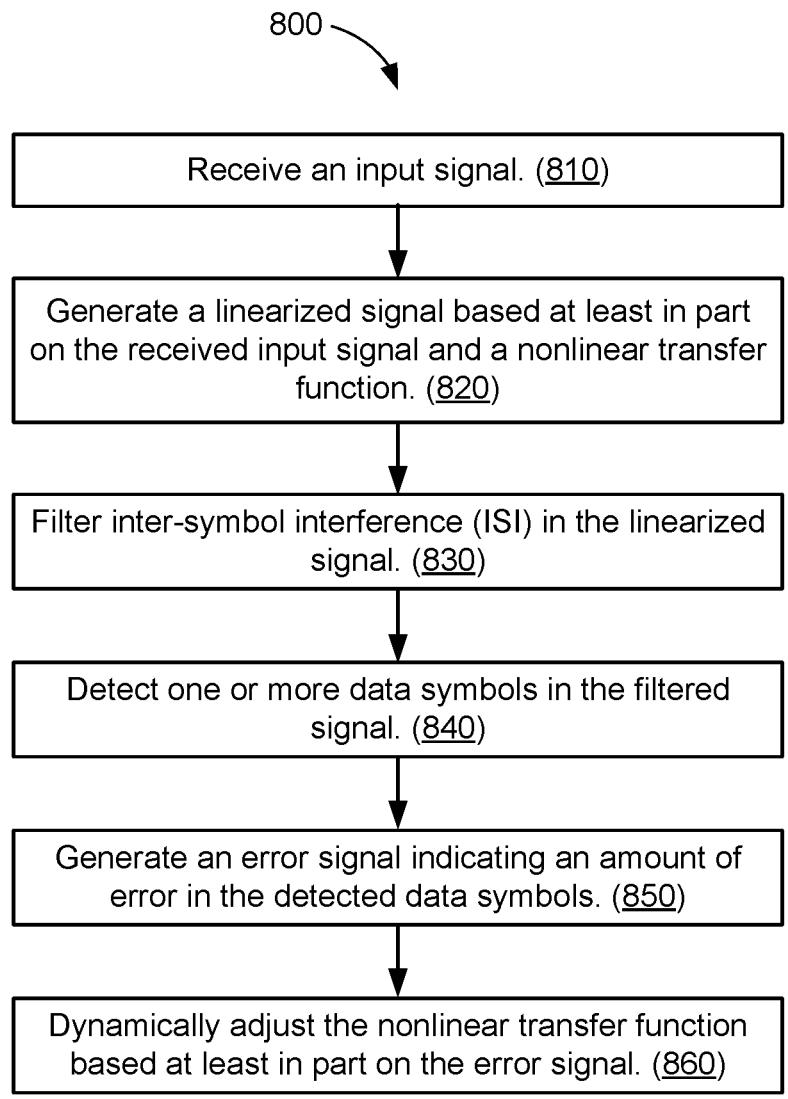
FIG. 8 is an illustrative flow chart depicting an example operation of an equalizer circuit with nonlinearity compensation, in accordance with some embodiments.

FIG. 8 is an illustrative flow chart depicting an example operation 800 of an equalizer circuit with nonlinearity compensation, in accordance with some embodiments. With reference for example to FIG. 3, the example operation 800 may be performed by the equalizer circuit 300 to recover one or more data symbols from a received input signal.

The equalizer circuit 300 may first receive an input signal (810). With reference for example to FIG. 1, the input signal may correspond to a data signal 102 sent by a transmitter 110 over a communication channel 120. As described above, various components of the communication system 100 may introduce nonlinearities in the data signal 102.

The equalizer circuit 300 may generate a linearized signal based at least in part on the received input signal and a nonlinear transfer function (820). For example, the equalizer circuit 300 may include an adaptive nonlinear filter 310, providing the nonlinear transfer function, to compensate for nonlinearities in the received input signal. The adaptive nonlinear filter 310 may counteract the nonlinearities inherent in the input signal so that the linearized signal has a more linear relationship with respect to the data signal that was originally transmitted (e.g., by the transmitter 110).

The equalizer circuit 300 may filter inter-symbol interference (ISI) in the linearized signal (830). As described above, the communication channel used for high-speed serial transmissions may introduce frequency-dependent attenuation in the form of ISI. With reference for example to FIG. 4, the equalizer circuit may include equalization circuitry 420-450 to cancel or reduce ISI in the received data signal. For example, the FFE 420 may perform linear equalization on the linearized signal and the DFE 450 may perform nonlinear equalization on the linearized signal.

The equalizer circuit 300 may detect one or more data symbols in the filtered signal (840). With reference for example to FIG. 4, the equalization circuitry may further include a slicer 440 to compare the voltage of the linearized signal with one or more voltage thresholds associated with known data symbols. More specifically, the slicer 440 may determine each of the data symbols based on the comparison.

The equalizer circuit 300 may further generate an error signal indicating an amount of error in the detected data symbols (850). With reference for example to FIG. 4, the slicer 440 may further output an error signal based, at least in part, on a result of the symbol detection. More specifically, the error signal may indicate an amount of error or difference between the actual voltage (e.g., of the linearized signal) resulting in the detection of each of the data symbols and the expected voltage for each symbol.

The equalizer circuit 300 may dynamically adjust the nonlinear transfer function based at least in part on the error signal (860). In some embodiments, the error signal from the equalization circuitry may be provided, as a feedback signal, to the adaptive nonlinear filter 310. The adaptive nonlinear filter 310 may use the information from the error signal to dynamically adjust its nonlinear transfer function (e.g., as described above with respect to FIGS. 4-6). Accordingly, the adaptive nonlinear filter 310 may provide a nonlinear transfer function that more accurately models the actual nonlinearities in the input signal and adapts to changes in the nonlinearities at any given time.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An equalizer circuit, comprising:
a filter configured to produce a linearized signal based at least in part on a received input signal and a nonlinear transfer function;
equalization circuitry configured to filter inter-symbol interference (ISI) and detect one or more data symbols in the linearized signal, the equalization circuitry being further configured to produce an error signal indicating an amount of error in the detected data symbols; and
a filter adaptation circuit configured to dynamically adjust the nonlinear transfer function of the filter based at least in part on the error signal from the equalization circuitry.

2. The equalizer circuit of claim 1, wherein the filter comprises:
a first multiplier to produce a first polynomial signal by multiplying the input signal with itself, wherein the linearized signal is based at least in part on a combination of the input signal and the first polynomial signal.

3. The equalizer circuit of claim 2, wherein the filter further comprises:
a first filter tap to provide a scaled input signal by multiplying the input signal by a first scalar quantity;
a second filter tap to provide a scaled first polynomial signal by multiplying the first polynomial signal by a second scalar quantity; and
an adder to sum the scaled input signal and the scaled first polynomial signal, wherein the linearized signal is based at least in part on the sum.

4. The equalizer circuit of claim 3, wherein the filter adaptation circuit is configured to selectively adjust at least one of the first or second scalar quantities based at least in part on the error signal.

5. The equalizer circuit of claim 3, wherein the filter adaptation circuit determines each of the first and second scalar quantities based at least in part on a least mean square of the error signal.

6. The equalizer circuit of claim 3, further comprising:
a second multiplier to produce a second polynomial signal by multiplying the first polynomial signal with the input signal; and
a third filter tap to provide a scaled second polynomial signal by multiplying the second polynomial signal by a third scalar quantity.

7. The equalizer circuit of claim 6, wherein the adder is to further sum the scaled input signal, the scaled first polynomial signal, and the scaled second polynomial signal.

8. The equalizer circuit of claim 6, wherein the filter adaptation circuit is further configured to selectively adjust at least one of the first, second, or third scalar quantities based at least in part on the error signal.

9. The equalizer circuit of claim 6, wherein the filter adaptation circuit determines each of the first, second, and third scalar quantities based at least in part on a least mean square of the error signal.

10. A method of equalization, comprising:
receiving an input signal;
generating a linearized signal based at least in part on the received input signal and a nonlinear transfer function;
filtering inter-symbol interference (ISI) in the linearized signal;
detecting one or more data symbols in the filtered signal;
generating an error signal indicating an amount of error in the detected data symbols; and
dynamically adjusting the nonlinear transfer function based at least in part on the error signal.

11. The method of claim 10, wherein the generating of the linearized signal comprises:
multiplying the input signal with itself to produce a first polynomial signal, wherein the linearized signal is based at least in part on a combination of the input signal and the first polynomial signal.

12. The method of claim 11, wherein the generating of the linearized signal further comprises:
multiplying the input signal by a first scalar quantity to produce a scaled input signal;
multiplying the first polynomial signal by a second scalar quantity to produce a scaled first polynomial signal; and summing the scaled input signal and the scaled first polynomial signal, wherein the linearized signal is based at least in part on the sum.

13. The method of claim 12, wherein the dynamically adjusting comprises:
selectively adjusting at least one of the first or second scalar quantities based at least in part on the error signal.

14. The method of claim 12, wherein the generating of the linearized signal further comprises:
multiplying the first polynomial signal with the input signal to produce a second polynomial signal; and
multiplying the second polynomial signal by a third scalar quantity to produce a scaled second polynomial signal.

15. The method of claim 14, wherein the summing comprises:
summing the scaled input signal, the scaled first polynomial signal, and the scaled second polynomial signal.

16. The method of claim 14, wherein the dynamically adjusting comprises:
selectively adjusting at least one of the first, second, or third scalar quantities based at least in part on the error signal.

17. An equalizer circuit, comprising:
a filter configured to receive an input signal, the filter including:
a first multiplier to produce a first polynomial signal by multiplying the input signal with itself;
a first filter tap to provide a scaled input signal by multiplying the input signal by a first scalar quantity;
a second filter tap to provide a scaled first polynomial signal by multiplying the first polynomial signal by a second scalar quantity; and
an adder to produce a linearized signal based at least in part on a sum of the scaled input signal and the scaled first polynomial signal;
equalization circuitry configured to filter inter-symbol interference (ISI) and detect one or more data symbols in the linearized signal, the equalization circuitry being further configured to produce an error signal indicating an amount of error in the detected data symbols; and
a filter adaptation circuit configured to dynamically adjust the first and second scalar quantities based at least in part on the error signal.

18. The equalizer circuit of claim 17, wherein the filter further comprises:
a second multiplier to produce a second polynomial signal by multiplying the first polynomial signal with the input signal; and
a third filter tap to provide a scaled second polynomial signal by multiplying the second polynomial signal by a third scalar quantity.

19. The equalizer circuit of claim 18, wherein the adder is to produce the linearized signal by summing the scaled input signal, the scaled first polynomial signal, and the scaled second polynomial signal.

20. The equalizer circuit of claim 18, wherein the filter adaptation circuit is further configured to selectively adjust at least one of the first, second, or third scalar quantities based at least in part on the error signal.

* * * * *